Jan. 2, 1934.  F. C. RUSSELL ET AL  1,942,127
INTERNAL COMBUSTION ENGINE
Filed Nov. 25, 1931

Inventors:-
Frederick C. Russell.
John H. Bradbury
Walter Gunn

By their Attorney:-

Patented Jan. 2, 1934

1,942,127

UNITED STATES PATENT OFFICE 1,942,127

INTERNAL COMBUSTION ENGINE

Frederick Clifton Russell, Altrincham, and John Henry Bradbury, Ashton-on-Mersey, England Application November 25, 1931, Serial No. 577,282, and in Great Britain and Ireland February 5, 1931

6 Claims. (Cl. 123—32)

This invention relates to internal combustion engines of the kind having a combustion chamber into which an air charge is driven and compressed by the piston and into which charge the combustible fluid is injected, the combustion chamber being shaped and the air and fuel inlets thereto positioned so that the charges enter tangentially in a swirling motion, and in which also the piston is provided with an extension adapted to enter a passage between the cylinder and combustion chamber, so as to form a restricted passage through which the last portion of the air charge is injected at a higher velocity (hereinafter referred to as the "injected air stream"), creating an accelerated revolution of the charge in the combustion chamber to assist combustion.

In engines of the above kind the fuel has been injected through the periphery of the accelerated revolving stream of air charge.

According to the invention the combustion chamber is shaped to provide a relatively short axis of revolution and the fuel and air are injected relatively off-set therein so that substantially separate coaxial side-by-side co-directional revolving streams of air and fuel are formed.

Figure 1:
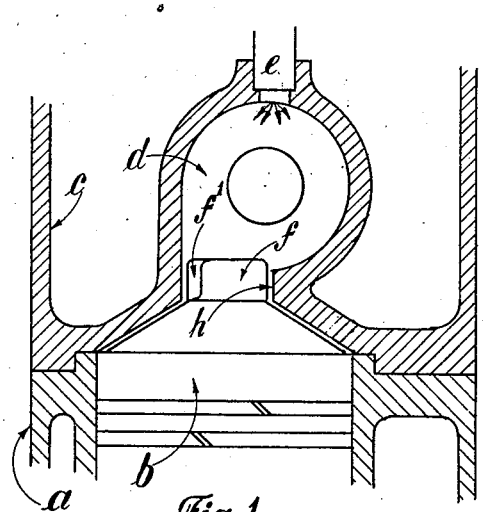
Fig. 1 is a diagrammatic sectional elevation of one example of the invention.

As shown in the drawing, $a$ is the engine cylinder, $b$ is the cylinder piston, $c$ is the cylinder head and $d$ is the off-set combustion chamber; $e$ is the fuel injector, $f$ is the extension of the piston $f^1$, $f^1$ are the passages in the extension, $h$ is the passage between the cylinder and combustion chamber, and $h^1$, $h^1$ are the passages formed in the passage $h$.

Figure 3:
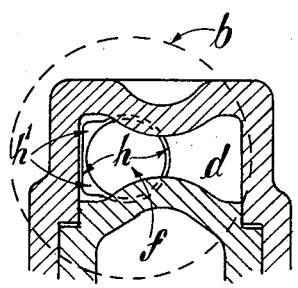
Fig. 3 is a plan of a modification.
Figure 2:
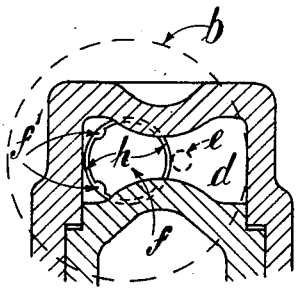
Fig. 2 is a plan of Fig. 1.
Figure 4:
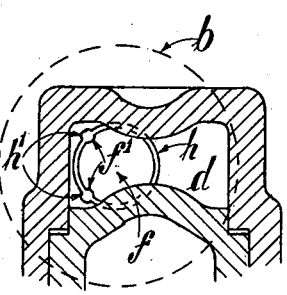
Fig. 4 is a plan of a further modification.

As will be observed in the example shown in Figs. 1 and 2, two laterally disposed passages $f^1$, $f^1$ are provided in the piston extension, whereas in Fig. 3 these are displaced by two laterally disposed passages $h^1$ $h^1$ in the passage $h$. In Fig. 4 the passages for the injection of the air consist both of passages $f^1$, $f^1$ and $h^1$, $h^1$ in cooperative arrangement.

Figure 5:
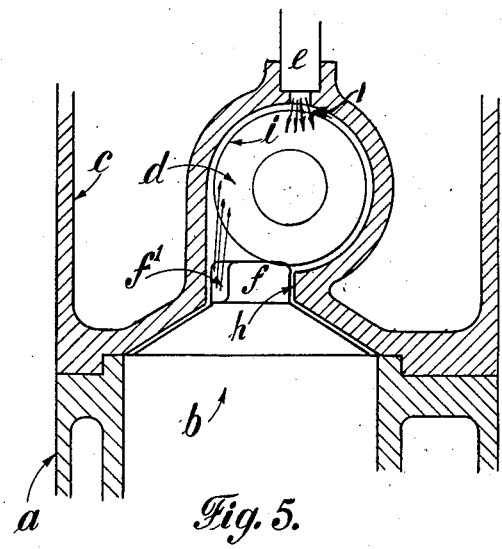
Figs. 5, 6 and 7 are further repeat sectional views illustrating the operation of the invention.
Figure 6:
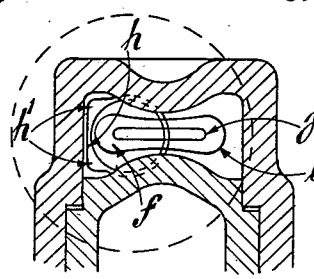
Figure 7:
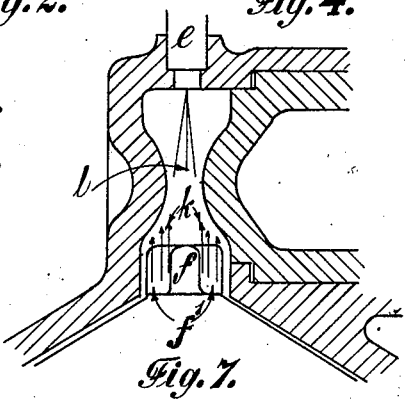

As shown in Figs. 5, 6 and 7, lines $i$ and $j$ are shown representing the divisions between zones of action in the combustion chamber, arrows $k$ and $l$ being also shown to indicate the path of the injected air stream and of the fuel respectively.

The invention is based upon careful observation of internal combustion engines of the type of which the invention is an improvement, from which it was believed that the use of a revolving air charge in the combustion chamber, while itself being an improvement, had the result of establishing, as it were, three zones within the combustion chamber. These zones were, ($a$) a slow speed high pressure dense outer zone, i. e. that outside the line $i$ and next the wall of the chamber, its speed being reduced by the scrubbing action against the wall of the chamber, ($b$) an intermediate higher speed zone of moderate pressure, i. e. that between the lines $i$ and $j$, and ($c$) a central pocket or core, i. e. that within the line $j$, in which there is the highest temperature but slowest motion. It was believed that the air in the outer zone was not being properly utilized, the fuel not breaking through into the dense mass of the high pressure zone, and that the velocity of the accelerated portion of the zone ($b$) was causing the fuel to be thrown against the dense zone preventing it from mixing therewith.

The features of the present invention are provided to meet these deductions. In the first place, the injected air streams of which there will usually be two, are respectively placed near the side walls of the chamber where they have the effect of rupturing the high pressure zone ($a$). The convex side walls of the chamber reduce the pocket or core ($c$) and concentrate and control the high temperature vortex therein. The relatively off-set fuel injection stream being laterally disposed to, or between the divided accelerated portion of the intermediate zone enables the fuel to mix with the ruptured high pressure zone, and also avoids contact of the fuel with the walls of the chamber, and provides substantially separated coaxial side-by-side and co-directional streams of revolution of air and fuel.

Although, as illustrated, divided air streams are preferable, the advantage is obtained by reason of the off-set disposition of the air and fuel stream in combination with the shortened axis of revolution. The provision of a single laterally disposed, (i. e. off-set) air jet stream with the shortened axis of revolution, is, therefore, within the present invention and was the first form in which the invention was tested.

The exact position and direction of injection of the fuel appears to have little effect on the efficiency of the combustion, providing it is laterally of, or between the accelerated part or parts of the intermediate zone and provided the shortened axis of revolution is obtained. If the fuel injection is brought to one side or the other (i. e. into the air stream) the exhaust shows signs of incomplete combustion.

What we claim is:—

1. In an internal combustion engine having a separate ignition chamber shaped substantially as a volume of revolution with a tangential inlet passage communicating with the engine cylinder, into which passage a projection on the engine piston is adapted to enter, restricting the same so as to deliver the last portion of the charge tangentially into the chamber as a jet with relatively accelerated velocity; an inwardly directed fuel injection jet in the periphery of the ignition chamber arranged in a zone of revolution off set axially from the zone of revolution into which the jet of the accelerated charge is directed.

2. In an internal combustion engine having a separate ignition chamber shaped substantially as a volume of revolution with a tangential inlet passage communicating with the engine cylinder, into which passage a projection on the engine piston is adapted to enter, restricting the same so as to deliver the last portion of the charge tangentially into the chamber as a jet with relatively accelerated velocity; an inwardly directed fuel injection jet in the periphery of the ignition chamber arranged in a zone of revolution off set axially from the zone of revolution into which the jet of the accelerated charge is directed and inwardly directed convex end walls to the ignition chamber.

3. In an internal combustion engine having a separate ignition chamber shaped substantially as a volume of revolution with a tangential inlet passage communicating with the engine cylinder, into which passage a projection on the engine piston is adapted to enter, restricting the same so as to deliver the last portion of the charge tangentially into the chamber as a jet with relatively accelerated velocity; an inwardly directed fuel injection jet in the periphery of the ignition chamber arranged in a zone of revolution off set axially from the zone of revolution into which the jet of the accelerated charge is directed and a cylindrical inner peripheral wall to the ignition chamber.

4. In an internal combustion engine having a separate ignition chamber shaped substantially as a volume of revolution with a tangential inlet passage communicating with the engine cylinder, into which passage a projection on the engine piston is adapted to enter, restricting the same so as to deliver the last portion of the charge tangentially into the chamber as a jet with relatively accelerated velocity; and inwardly directed fuel injection jet in the periphery of the ignition chamber arranged in a zone of revolution off set axially from the zone of revolution into which the jet of the accelerated charge is directed, inwardly directed convex end walls and a cylindrical inner peripheral wall to the ignition chamber.

5. In an internal combustion engine having a separate ignition chamber shaped substantially as a volume of revolution with end walls and with a tangential inlet communicating with the engine cylinder, into which passage a projection on the engine piston is adapted to enter restricting the same so as to deliver the last portion of the charge into the chamber as a jet with relatively accelerated velocity relatively shaped communicating passage and piston projection to provide two substantially separate accelerated jets tangentially directed into zones of revolution adjacent to the end walls of the ignition chamber and a fuel injection jet in the periphery of the ignition chamber arranged in and directed internally into a zone of revolution between the two zones of revolution aforesaid.

6. In an internal combustion engine having a separate ignition chamber shaped substantially as a volume of revolution with end walls and with a tangential inlet communicating with the engine cylinder, into which passage a projection on the engine piston is adapted to enter restricting the same so as to deliver the last portion of the charge into the chamber as a jet with relatively accelerated velocity, relatively shaped communicating passage and piston projection to provide two substantially separate accelerated jets tangentially directed into zones of revolution adjacent to the end walls of the ignition, a fuel injection jet in the periphery of the ignition chamber arranged in and directed internally into a zone of revolution between the two zones of revolution aforesaid, inwardly directly convex walls and a cylindrical inner peripheral wall to the ignition chamber.

FREDERICK CLIFTON RUSSELL.
JOHN HENRY BRADBURY.